(No Model.)
F. D. OWEN.
BRAKE FOR BICYCLES.
No. 478,206. Patented July 5, 1892.
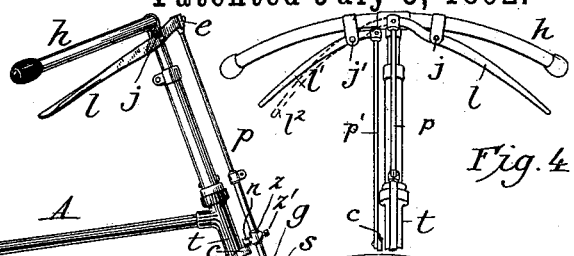
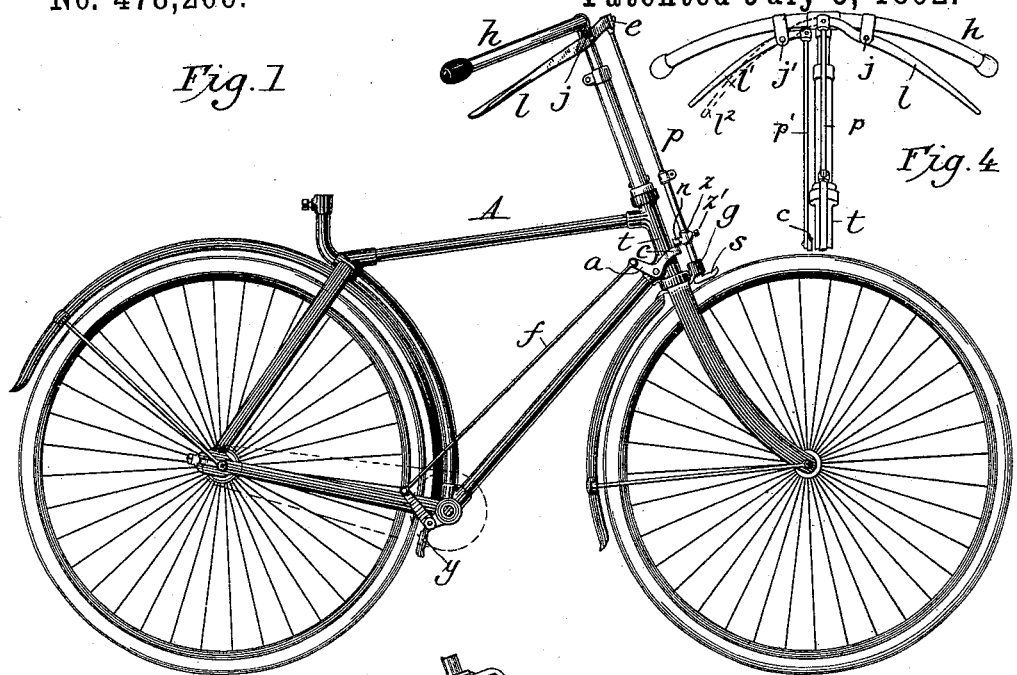
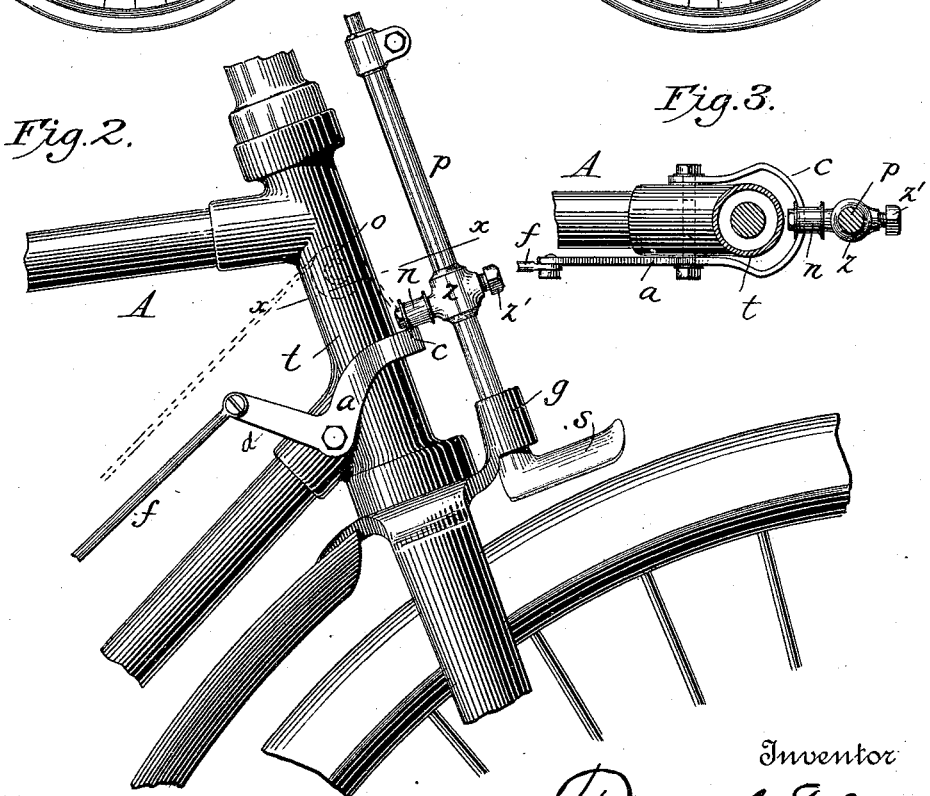
Witnesses
Sidney P. Hollingsworth
Harry E. Cooper
Inventor
Frederick D. Owen

UNITED STATES PATENT OFFICE.

FREDERICK D. OWEN, OF WASHINGTON, DISTRICT OF COLUMBIA.

BRAKE FOR BICYCLES.

SPECIFICATION forming part of Letters Patent No. 478,206, dated July 5, 1892.

Application filed November 20, 1891. Serial No. 412,521. (No model.)

*To all whom it may concern:*

Be it known that I, FREDERICK D. OWEN, a citizen of the United States, residing in the city of Washington and District of Columbia, have invented certain new and useful Improvements in Bicycles; and I hereby declare the following to be a clear and full description of the same, reference being had to the accompanying drawings.

My invention for which I apply for Letters Patent is an improvement on bicycles, but more especially the brake governing the same, or means for controlling the speed of the cycle and rider by the use of a double brake. I propose to accept for my foundation the present form of a Safety bicycle, in which the two wheels are more or less of the same size and the rider sits between them; or, better, a little over the rear or driving wheel, the steering being effected by means of a handle-bar secured to the front wheel and the brake applied by means of a lever attached to the handle-bar and working a vertical rod, which rod, through suitable connections, operates a brake-shoe at the periphery of one or other of the wheels. If applied to the front wheel, the hand-lever attached to the handle or steering bar engages directly by means of a plunger or vertical rod with a shoe called the "brake-shoe," which either acts directly as a plunger-brake or by a brake-shoe hinged to the steering-fork, and when pressed swings down against the periphery or rubber of the front wheel, thereby reducing the speed at the will of the rider.

Another means of braking the wheel in common use is by pivoting the vertical plunger-rod to one arm of a bell-crank lever hinged to the side of the frame, the other arm of which is connected by rods or cords of some suitable material to a brake-shoe hinged to the frame in a convenient position to bear on the driving-wheel.

In new and larger hollow forms of tires one brake operating on either front or rear wheel has been found inadequate, as the larger forms of tire are more elastic and therefore slip past the brake-shoe and do not hold as well as in the older form of tires. Herein lies the advantage of my invention as herein described.

It is highly important in cycling to have the machine entirely under control, and it is to this end—that of producing more friction on the wheels by means of the same lever-arm and plunger—that my invention is directed, and it may be briefly described as follows: To the plunger-rod is secured a brake-shoe, as usual. In some convenient position to bear on the rear wheel is pivoted a second brake-shoe, connected by rods or cords to a bell-crank lever pivoted to the frame near the plunger-rod. Adjustably secured to the plunger-rod is a stop that can be so adjusted as to engage the bell-crank lever in such a manner as to operate the rear brake alone or in connection with the front brake; or the stop can be so placed as to be out of engagement with the bell-crank lever, and then the front brake alone would be operated.

In the drawings, Figure 1 is a side elevation of so much of a bicycle as is necessary to illustrate my invention. Fig. 2 is an enlarged view of the head of the bicycle. Fig. 3 is a cross-section on the line $xx$, and Fig. 4 shows a modification.

In the drawings, A represents the frame of a modern bicycle with the handle-bar $h$ and steering-tube as commonly used, with a curved brake-lever arm $l$ placed under the handle-bar and hinged to it in a joint $j$. At the end of the bar is an eye $e$, in which is jointed the vertical plunger-rod $p$, connected at the bottom directly with the front wheel brake-shoe $s$, which is held in place by guides $g$ on the head. On the side of the head-tube $t$ is a bell-crank lever $a$. This bell-crank lever has one arm curved, as at $c$, running radially around the steering-head tube and made so as to be engaged by an adjustable sleeve $z$, which is held fast to the vertical rod by a set-nut $z'$, and said rocking elbow or bell-crank lever $a$ has connected with the other arm $d$ a tension rod, string, or wire $f$, that will suffice to operate the rear pivoted brake-shoe $y$, located on the frame near the periphery of the driving-wheel. The adjustable sleeve $z$ on the plunger-rod $p$ carries a roller $n$, which bears on the curved arm of the bell-crank lever. This roller may, however, be omitted and a stud substituted.

A bicycle provided with my invention is equipped to suit the taste or preference of all riders. Should one rider prefer a "front-wheel brake," it is only necessary to loosen the screw $z'$ and raise the stop $z$ high enough on the plunger-rod to prevent the roller $n$ from engaging the curved arm of the bell-crank lever. If a rear-wheel brake alone is desired, moving the stop downward to such a position that when the plunger-rod is depressed the roller engaging the bell-crank lever operates the rear-wheel brake before the front brake has been brought into contact with the tire of the front wheel. When the stop is set in a position between the two, as described, by operating the hand-lever $l$ and pushing down the plunger-rod both brakes will act simultaneously, stopping both wheels.

In place of a brake-shoe bearing on the periphery of each wheel a drum or drums secured to each wheel and provided with a friction-shoe may be used. The same adjustable sleeve $z$ may have a chain or metallic wire or some flexible material attached to it, moving over a pulley $o$, securely fastened to a part of the steering-head and connected to the rear lever brake-shoe $y$, thereby producing the same result as in the former case.

In either and all mechanical combinations that may appear for the coupling of one brake with the other when applied to different wheels of a cycle the general principle is what I desire to claim as my invention, inasmuch as one and the same steering-frame hand-lever or hand-levers must of necessity apply the force or pressure to stop the machine and rider, for by using two such independent brakes, located on the frame of each wheel, so as to engage the wheels, respectively, additional friction is gained at a minimum of expense to the hollow and more delicate tires.

The same result of two brake-shoes working independently upon each wheel may be effected by two separate brake-levers $l\ l'$, attached one on the right and one on the left side of the steering-bar, as shown in Fig. 4, or each may be fastened by the same pivot, as at $l'\ l^2$, so as to work from the same side—generally the right side—and in this case one bar may be made one end long and the other short for convenient use in riding dangerous roads.

Having thus fully described my improved bicycle, what I claim therein as new and as of my own invention is—

1. In a bicycle, each wheel, in combination with a brake-shoe attached to the frame of the wheel, respectively, and to operate on each wheel independently at the will of the rider by a governing brake-lever located on the handle-bar connecting one (compression) plunger or (tension) pull-brake connection with an adjustable attachment coupling the two brake connections, all as shown and described.

2. In a bicycle, the combination of two independent brakes, one brake located on the frame so as to engage the front wheel and one brake located on the frame so as to engage the rear wheel and governed separately or simultaneously, as desired, with one brake-lever attached to and pivoted on the handle-bar and engaging one (compression) plunger or (tension) pull-brake connection with an adjustable coupling device, substantially as shown and described.

3. The combination, with the wheels of a bicycle, of brakes arranged to engage the wheels, a brake-lever located on the handle-bar with one (compression) plunger or (tension) pull connection between the hand-lever and brake-shoes, and connecting and adjusting devices, whereby either one only of the brakes may be made to operate or by which both brakes may be made to operate simultaneously.

4. The combination of the wheels of a bicycle with two brakes attached to the frame so as to engage the wheels, respectively, and operate with one hand brake-lever connecting with one adjustable plunger brake-rod or an adjustable pull-brake connection, applying the force at the will of the rider, whereby one brake will be engaged previous to and stronger than the other brake, substantially as herein shown and described.

5. In a bicycle or like vehicle having two brakes located on the frame of the cycle so that each brake will engage the wheels, respectively, the combination of one hand brake-lever located on the handle-bar and connecting one adjustable plunger brake-rod or an adjustable pull-brake member with an adjustable coupling device, all governed at the will of the rider, whereby either brake may be made to operate or both brakes may be made to operate, all as shown and described.

6. The combination of two brakes of a bicycle operating one on the frame of each wheel so as to engage the wheels, respectively, at the will of the rider with two separate hand-levers attached to and pivoted on the steering-frame of the bicycle, said hand-levers engaging one and the same brake-rod, substantially as described.

In testimony whereof I have hereunto subscribed my name.

FREDERICK D. OWEN.

Witnesses:
HENRY E. COOPER,
SIDNEY P. HOLLINGSWORTH.